United States Patent
Schrader et al.

(10) Patent No.: US 8,548,454 B2
(45) Date of Patent: Oct. 1, 2013

(54) METHODS, MOBILE NETWORK NODE AND MOBILE TERMINAL FOR REDUCING THE NUMBER OF UNSUCCESSFUL SERVICE CHANGE REQUESTS PERFORMED BY THE MOBILE TERMINAL

(75) Inventors: Jörg Schrader, Aachen (DE); Patrice Hédé, St-Germain-en-Laye (FR); John Kerr, Herzogenrath (DE)

(73) Assignee: Unwired Planet, LLC, Reno, NV (US)

( * ) Notice: Subject to any disclaimer, the term of this patent is extended or adjusted under 35 U.S.C. 154(b) by 612 days.

(21) Appl. No.: 12/375,356

(22) PCT Filed: Jul. 28, 2006

(86) PCT No.: PCT/EP2006/064795
§ 371 (c)(1),
(2), (4) Date: Feb. 10, 2012

(87) PCT Pub. No.: WO2008/011918
PCT Pub. Date: Jan. 31, 2008

(65) Prior Publication Data
US 2013/0005325 A1     Jan. 3, 2013

(51) Int. Cl.
*H04M 11/00* (2006.01)
(52) U.S. Cl.
USPC ..... 455/421; 455/434; 455/432.3; 455/422.1; 455/423; 455/417
(58) Field of Classification Search
USPC .............. 455/434, 432.3, 435.2, 414.3, 417, 455/423, 421, 422.1
See application file for complete search history.

(56) References Cited

U.S. PATENT DOCUMENTS

| 5,732,347 | A | * | 3/1998 | Bartle et al. | 455/421 |
| 2005/0288002 | A1 | * | 12/2005 | Sparks et al. | 455/418 |
| 2007/0294405 | A1 | * | 12/2007 | Mohindra et al. | 709/226 |

FOREIGN PATENT DOCUMENTS

WO    WO 2005/004526 A    1/2005

OTHER PUBLICATIONS

"Universal Mobile Telecommunications System (UMTS)" ETSI Standards, European Telecommunications Standards Institute, Sophia-Antipo, FR, vol. 3-CN3, No. V560, Jun. 2005.

* cited by examiner

*Primary Examiner* — Kathy Wang-Hurst
(74) *Attorney, Agent, or Firm* — Nixon & Vanderhye P.C.

(57) ABSTRACT

A method for reducing the number of unsuccessful service change attempts of a first mobile terminal is presented. The mobile terminal (1, 1a, 1b, 420) is connectable via a mobile network to a further terminal by establishing a call connection for providing a first service or by establishing a call connection for providing a second service. The method comprises the following steps performed by the first mobile terminal (1, 1a, 1b, 420): receiving (S21) a first indication signal (202) indicating that a service change towards the second service is temporarily unavailable from a mobile network node (31, 310) administrating an established call connection for providing the first service, and in response to receiving the first indication signal (202) refraining (S22) from requesting a service change towards the second service until reception of a further indication signal (204) from the mobile network node (31, 310) indicating that a service change is available again.

20 Claims, 4 Drawing Sheets

METHODS, MOBILE NETWORK NODE AND MOBILE TERMINAL FOR REDUCING THE NUMBER OF UNSUCCESSFUL SERVICE CHANGE REQUESTS PERFORMED BY THE MOBILE TERMINAL

FIELD OF INVENTION

The invention relates to a mobile network node and a mobile terminal for performing a signaling method and respective signaling methods in the node and the terminal, all of them suitable to avoid unsuccessful service change attempts in a mobile network.

BACKGROUND

For calls between parties in a mobile network different services have been developed, such as speech, data and video services. For multimedia service calls, the 3GPP ($3^{rd}$ Generation Partnership project) has standardized a multimedia service transported over UDI (Unrestricted Digital Information) bearers in its TS (technical specification) 26.111.

According to the 3GPP TS 26.111 a call set-up for multimedia calls is standardized, however a service change towards another service, e.g. a speech service is not foreseen. According to 3GPP TS 26.111, if the terminating user equipment or the network providing connectivity towards the terminating user equipment do not support the provision of a multimedia service, a multimedia call to be set up is rejected.

Users wishing to temporarily switch between a speech call and a multimedia call would have to terminate the ongoing call with the old service type and redial to set up a new call for the new service type.

In 3GPP release 5, a new functionality has been introduced that is termed SCUDIF (Service Change and UDI Fallback). SCUDIF is intended to provide a more user-friendly CS (circuit switched) multimedia service and is standardized in the 3GPP TS 23.172.

SCUDIF offers the capability to fallback to a single service i.e. to a speech service or a multimedia service at call set-up and to switch between services during the active phase of the call. The fallback feature allows calls being set-up for providing a multimedia service to fallback to a speech service when a transit network, a terminating network or the mobile terminal of the B-party do not support the multimedia service. Thus the SCUDIF feature provides fewer failed calls. The service change feature within SCUDIF allows the end users to switch between a speech service and a multimedia service.

When a user has setup a speech call and wishes to set up a multimedia call later, she or he will fail if the network conditions or the network equipment providing connectivity for the speech call do not provide the multimedia service. Thus a user repeatedly trying to set up a multimedia call may consume a large amount of signaling resources for unsuccessful service change attempts.

OBJECT OF THE INVENTION

Therefore it is an object of the invention to provide a network node, a terminal, a method in the network node and a method in the terminal that reduce the number of unsuccessful service change attempts.

SUMMARY OF THE INVENTION

According to the teachings of the present invention a method is provided for reducing the number of unsuccessful service change attempts of a first mobile terminal connectable via a mobile network to a further terminal by establishing a call connection for providing a first service or by establishing a call connection for providing a second service.

The method is remarkable in that it comprises the following steps performed by the first mobile terminal:
 receiving a first indication signal indicating that a service change towards the second service is temporarily unavailable from a mobile network node administrating an established call connection for providing the first service, and
 in response to receiving the first indication signal refraining from requesting a service change towards the second service until reception of a further indication signal from the mobile network node indicating that a service change is available again.

By this an unnecessary signaling related to unsuccessful service change attempts can be avoided and an unnecessary use of signaling resources can be minimized.

According to a further advantageous aspect of the invention the method in the mobile terminal comprises
 receiving a signal indicating that a service change towards the second service is available again as further indication signal, and
 after receiving the further indication signal indicating a service change request towards the mobile network node to request a service change towards the second service.

By this the issuing of service change requests can be resumed in a controlled way.

According to another advantageous aspect of the invention the first signal indicating that a service change is unavailable comprises an unavailability cause indication indicating a cause for the unavailability of the service change.

By this the mobile terminal can respond to the indication in a controlled way.

According to yet a further aspect of the invention the unavailability cause is indicated towards the user of the first mobile terminal.

By this the user satisfaction regarding the use of service change requests can be increased.

According to yet a further aspect of the invention the first service is a speech service and the second service is a video service or a multimedia service.

Furthermore, according to the teachings of the present invention a mobile terminal for reducing the number of unsuccessful service change attempts is provided that is connectable via a mobile network to a second mobile terminal by means of a call connection for providing a first service or by means of a call connection for providing a second service. The mobile terminal is remarkable in that it comprises a receiver unit for receiving first indication signals indicating that a service change towards the second service is temporarily unavailable. The mobile terminal further comprises a receiver unit for receiving further indication signals indicating that a service change towards the second service is available again and a processing unit for processing an indication signal received as first indication signal and for refraining in response to said processing said first indication signal from requesting a service change towards the second service until reception of an indication received as further indication signal.

The mobile terminal provides the same advantages as the provided method in the mobile terminal.

Further advantageous aspects of the mobile terminal are provided that correspond to respective advantageous aspects of the provided method in mobile terminal.

Furthermore in accordance with the teachings of the present invention a method in a mobile network node for reducing the number of unsuccessful service change attempts of a first mobile terminal is provided. The mobile terminal is connectable via the mobile network to a second mobile terminal by establishing a call connection for providing a first service or a call connection for providing a second service and the mobile network node administrates an established call connection of the first mobile terminal for providing the first service.

The provided method is remarkable in that it comprises the following steps performed by the mobile network node:

determining that a service change towards the second service is temporarily unavailable for the first mobile terminal and sending an indication signal towards the first mobile terminal, indicating the temporal unavailability of the service change.

The method in the core network node provides corresponding advantages as the provided method in the mobile terminal.

According to another aspect of the teachings of the present invention the determining step comprises determining that the first mobile terminal has roamed into a radio network not supporting a call connection providing the second service.

By this radio network utilization can be increased.

According to a further aspect of the teachings of the present invention a bearer type, in particular a radio bearer type, is associated with the second service and the determining step comprises determining that a radio network node handling a radio connection towards the first mobile terminal does not support the bearer type associated with the second service.

By this bearer configuration can be improved.

According to yet another aspect of the teachings of the present invention a supplementary service is available for the first service and is not available for the second service and the determining step comprises determining that the supplementary service has been activated for the call connection providing the first service.

By this the utilization and/or acceptance of supplementary services can be increased.

According to a further aspect of the teachings of the present invention, the determining step comprises determining a cause for the unavailability of the service change and the sending step comprises including the unavailability cause into the indication signal.

By this the acceptance of service changes in the network may be increased.

According to yet another aspect of the present invention a method for reducing the number of unsuccessful service change attempts is provided in that the indication signal is a first indication signal and the determining step is a first determining step. The provided method comprises a second determining step for determining that a service change towards the second service is available again and a sending step for a sending a second indication signal indicating the availability of the service change towards the mobile station.

By this the provision of the second service can be improved.

Furthermore, in accordance with the teachings of the present invention a mobile network node for reducing the number of unsuccessful service change attempts of a first mobile terminal is provided. The first mobile terminal is connectable to a second mobile terminal by means of a call connection for providing a first service or a call connection for providing a second service, and the mobile network node is capable of administrating the first mobile terminal and an established call connection of the mobile terminal for providing the first service. The mobile network node is remarkable in that it comprises a service change unavailability determining unit for determining that a service change towards the second service is temporarily unavailable for the first mobile terminal and a sending unit for sending an indication signal towards the first mobile terminal, the indication signal indicating the temporal unavailability of the service change.

The network node provides the same advantages as the provided method in the mobile network node.

Further advantageous aspects of the mobile network node are provided that correspond to respective advantageous aspects of the provided method in mobile network node.

DETAILED DESCRIPTION OF EMBODIMENTS

Figure 1:
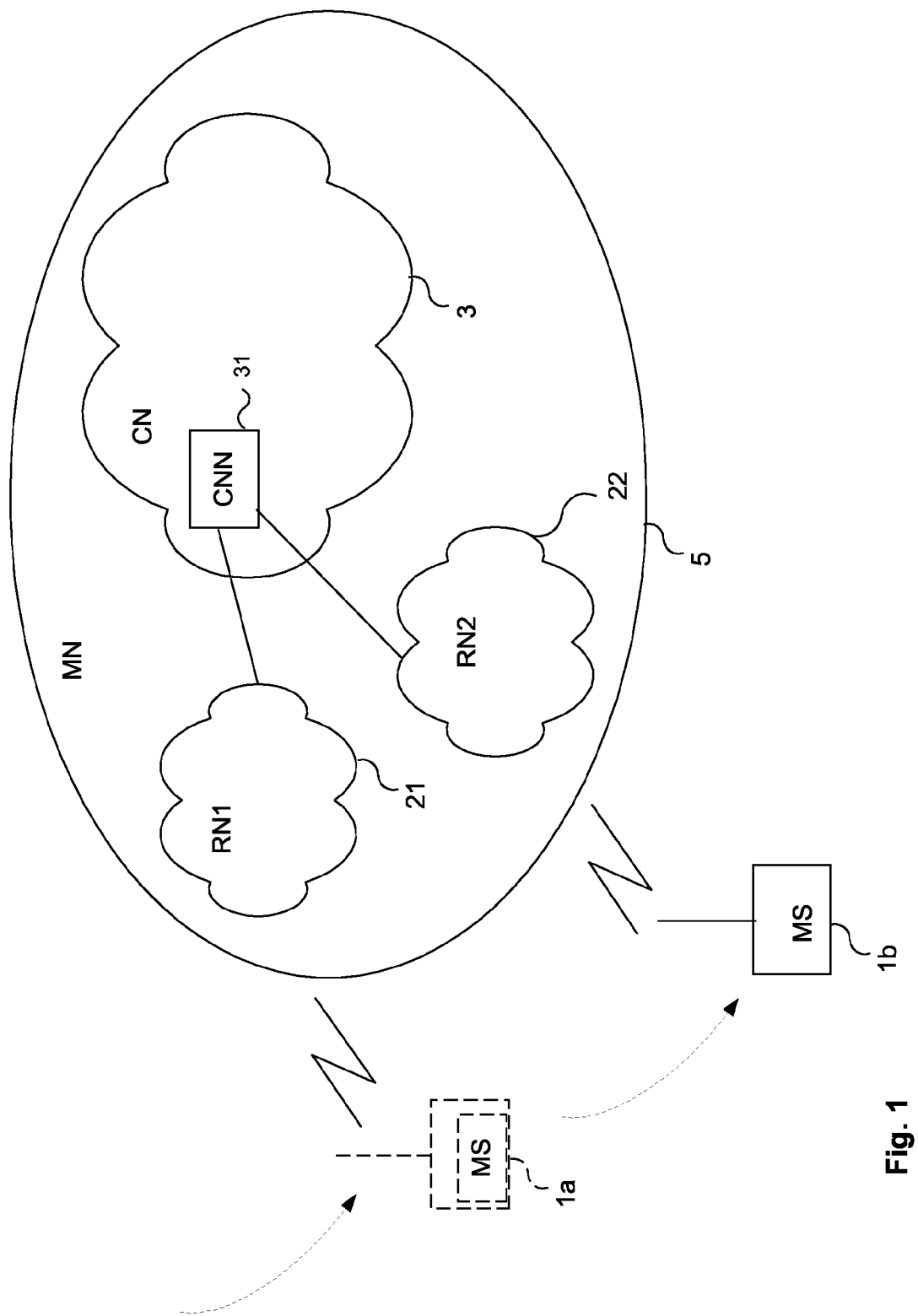
FIG. 1 is a block diagram illustrating a mobile communication network for performing in accordance with the teachings of the present invention

Reference is now made to FIG. 1 which is a block diagram illustrating a network architecture which may be used in accordance with the above described method for reducing the number of unsuccessful service changes. Such a mobile network (MN) 5 comprises a mobile station (MS) 1*a*, 1*b* which is connectable to a serving core network (CN) 3 via a first radio network (RN1) 21 or a second radio network (RN2) 22. MS 1*a*, 1*b* indicates one and the same mobile station located in different serving areas of the mobile network 5, or more precisely MS 1*a* indicates the mobile station where it is located in a serving area of the mobile network 5, where it served by the first radio network 21, and MS 1*b* indicates the mobile station, where it is located in a serving area of the mobile network 5, where it is served by the second radio network 22.

As indicated by the above dotted arrow the MS 1*a*, 1*b* has recently roamed into the serving area of the mobile network 5 served by the first radio network 21. As indicated by the below dotted arrow, the MS 1*a*, 1*b* further roams from the serving area of the mobile network 5 where it is served by the first radio network 21 into the serving area of the mobile network 5 served by the second radio network 22.

The mobile station is connectable to further communication partners within the mobile network 5 or another mobile network, by different types of connections, suitable for providing different types of services, such as a voice telephony service, a video telephony service, a data service or a multimedia service combing various media services.

The mobile station MS 1 is connectable to a further terminal via the mobile network, and in particular via the first or the second radio network 21, 22. The mobile station 5 is served by the core network node 31 that also administrates an established call connection between the first mobile terminal and a further terminal. The call connection provides a service of a specific service type.

The availability of specific ones of the different types of services may vary, e.g. depending on the radio network serving the mobile station 1a, 1b. For example when the mobile station is currently within the serving area of the mobile network served by the first radio network, a video telephony service may be unavailable for the mobile station 1a, whereas, when the mobile station 1b has roamed to where it is served by the second radio network 22, a video telephony service may be available for the mobile station 1b.

Figure 2:
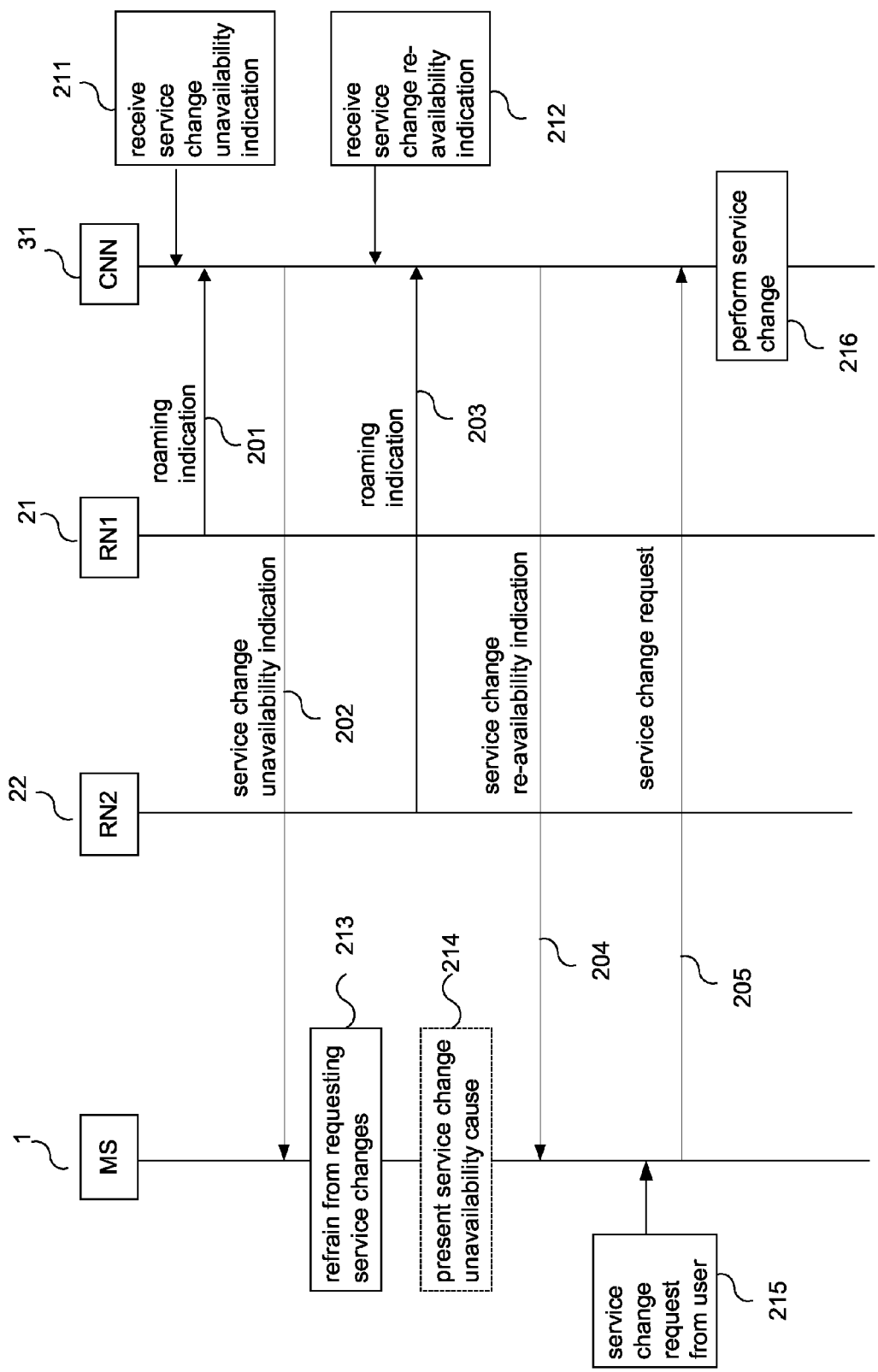
FIG. 2 is a signal sequence diagram for illustrating a sequence of signals exchanged between elements of the network of FIG. 1 to perform in accordance with the teachings the present invention

Reference is now made to FIG. 2 illustrating a signal sequence diagram depicting messages exchanged between the network elements of FIG. 1 for performing a method for reducing the number of unsuccessful service change attempts in accordance with the teachings of the present invention. In particular FIG. 2 depicts the mobile station 1, which is depicted in FIG. 1 as MS 1a, 1b, the first and the second radio network 21 and 22, as well as the core network node 31 that administrates the MS 1 as well as a call connection between the MS 1 and a further terminal.

The call connection provides a specific service. As already mentioned in connection with FIG. 1, different types of services, such as voice telephony services, data services, video telephony services, multimedia services and other types of services may be provided by different types of connections.

The availability of a particular service type may vary for various reasons, for example depending on the radio network that is currently serving the MS 1, as described above.

The procedure of FIG. 2 starts with step 211, in that the core network node 31 receives an indication, that a service change is currently unavailable for the call connection established for MS 1. This may be embodied as reception of a roaming indication 201 from the first radio network 21, indicating, that the MS 1 has recently roamed into the coverage area served by the first radio network 21, followed by a determining step determining, that a particular service type other than the current service type is unavailable for the MS 1, when it is served by the first radio network 21. The current service type may be e.g. a voice call service type and the first radio network 21 may be a GSM radio network only supporting voice call services.

Another potential cause for the unavailability of a service change indicated towards the CNN 31 may be a Serving Radio Network Support Node (SRNS) relocation, where the new SRNS does not support another service type than the current service type. Also the core network node administrating the MS 1a and its call connection may change, e.g. in an inter MSC handover and the new MSC may not support another service type than the current service type of the call connection.

Another potential cause for a change of the availability of a particular service type, may be that the user of the mobile station 1 has activated a supplementary service, e.g. a call forwarding service, which is available for the currently active call connection type of service but not for another service type. E.g. the user has activated a call forwarding service which is available for the current voice telephony service, but not for a video telephony service.

A further potential cause for the unavailability of a service change towards a new desired service type may be a change of the RNC (radio network controller) in the radio network currently serving the MS 1, wherein the new RNC does not support a modification of the radio access bearer towards a radio access bearer supporting the desired service type.

Yet another potential cause for the unavailability of a service change towards another service type is present if a mobile station participating in the connection does not support the desired service type or does not support any other service type than the current service type.

In response to the determining the unavailability of a service change or a limited availability of a service change, the core network node 31 sends an indication signal 202 to the mobile station 1, to indicate said unavailability of a service change towards the mobile station 1. Advantageously the signal indicating the unavailability of a service change to the mobile station comprises an indication of the service type, towards that a service change is currently unavailable.

Advantageously the core network node 31 determines a cause for the unavailability of a service change.

For example, when the core network node 31 is an MSC, the MSC may send a NOTIFY message according to the DTAP/RANAP (direct transfer application part/radio access network application part) NAS (non-access stratum) message towards the MS 1, which NOTIFY message comprises a notification indicator information element (IE) that indicates that a service change is unavailable or is unavailable for a particular service type and should be suspended. In a further advantageous embodiment the indication signal comprises a service change unavailability cause that may be also transmitted in the information element of the above NOTIFY message.

The MS 1 receives the indication signal 202 and refrains form issuing service change requests in a processing step 213. I.e. a service change attempt requested by the user of the MS 1 may not be issued.

By this an unnecessary core network signaling of service change attempts can be avoided. Furthermore unsuccessful codec modification or mid-call codec negotiation related to unsuccessful service changes and potential interruptions of an on-going conversation may be avoided.

Advantageously, when an unavailability cause has been transmitted towards the MS 1, the MS 1 presents the unavailability cause towards the user of the mobile station 1 via the user interface of the mobile station in a presentation step 214.

After determining the unavailability of the service change, the re-availability of a service change may be indicated towards the core network node in an indication step 212, indicating that the previously applicable reason for not performing service change attempts has now ceased to apply.

E.g. the core network node may be indicated in step 203 that the MS 1 has roamed to a service area of the mobile network, where the MS 1 is served by the second radio network 22 that supports a modification of the service type provided by aforementioned connection of the MS 1. Alternatively any other of the above described reasons for not performing service change attempts may have ceased to apply.

Accordingly the core network node 31 determines that service changes should be available again and sends a respective second indication signal 204 towards the MS 1. Like the indication signal 202, the second indication signal 204 may be embodied as a NOTIFY message according to the DTAP/RANAP protocol, that comprises an information element to indicate the re-availability of the service change.

Upon receiving and processing the indication signal 204, the MS 1 may resume with allowing the issuing of service change requests.

I.e., when a user inputs a service change request 215 into the user interface of the MS 1, the MS 1 will issue a service change request 205 to the core network node 31 e.g. as an ICM (in-call-modification) sent to the MSC.

In response to receiving the service change request 205, the core network node initiates a service change is the processing step 216.

Figure 3:
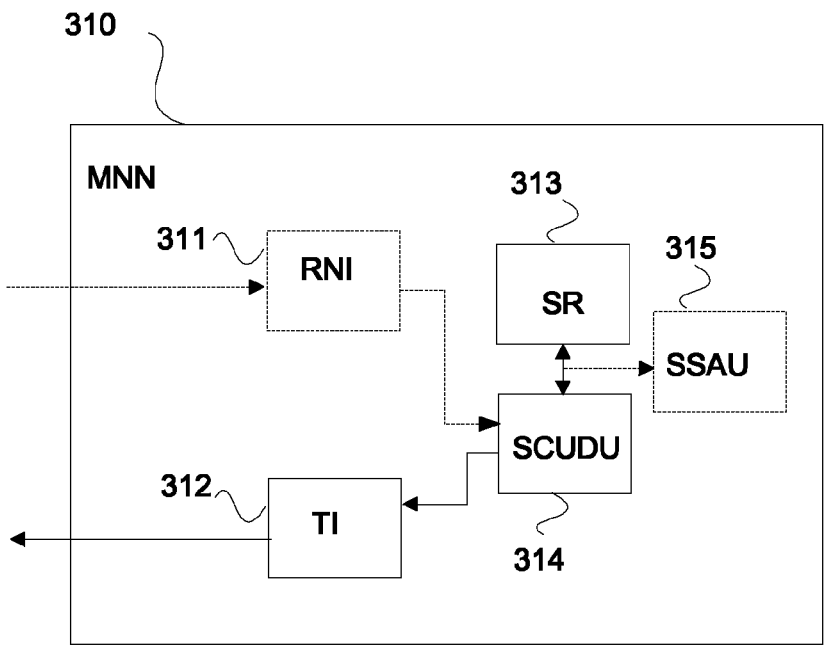
FIG. 3 is a block diagram depicting a mobile network node in accordance with the teachings of the present invention

FIG. 3 is a block diagram illustrating a MNN (mobile network node) 310 for reducing the number of unsuccessful service change attempts of a mobile station in accordance with the teachings of the present invention. The mobile network node 310 comprises a SR (register) 313 for administrating mobile subscribers and their terminals and call connections between administrated mobile terminals and terminals connected to them. The call connections are providing a specific service of a specific service type e.g. a speech service, a data service, a video telephony service or a multimedia service. To provide switching between the various service types SCUDIF (Service Change and UDI Fallback) functionality may be used in the mobile network node 310 and a connected mobile terminal that may issue service change request to initiate switching from a current service towards a target service. To change a service type a current call connection may be modified or replaced by a new connection.

To avoid unnecessary service change requests within a mobile terminal connected to the mobile network node and administrated within the register 313, the mobile network node 310 comprises a SCUDU (service change unavailability determination unit) 314 i.e. a processing unit that is adapted to determine that a service change towards a target service is currently unavailable for a mobile terminal administrated within the register 313.

According to the teachings of the present invention the service change unavailability determination unit 314 is further connected via a TI (terminal interface) 312 towards a specific or a plurality of mobile terminals administrated within the register 313. The service change unavailability detection unit 314 is arranged to detect that a service change is currently unavailable for a mobile terminal and to initiate assembling an indication signal indicating the unavailability of the service change towards the mobile terminal and sending the indication signal via the terminal interface 312.

The service change unavailability determining unit 314 advantageously is arranged to determine an unavailability cause and to initiate including the unavailability cause into the indication signal. A potential cause for an unavailability of a service change towards a specific service may be that the concerned mobile terminal has roamed into a region where the radio network providing radio connectivity for the mobile terminal does not support that specific service. For determining that cause a RNI (radio network interface) 311 may be provided for receiving a signal indicating that the mobile terminal has roamed into a region served by a radio network not supporting the specific service and for providing that indication towards the service change unavailability determining unit 314.

Another potential cause for an unavailability of a service change is that a specific bearer type is associated with the specific service and a radio network node handling a radio connection towards the concerned mobile terminal does not support the associated bearer type. Accordingly, for detecting that cause the radio network interface 311 may be arranged to receive a signal indicating that the mobile terminal has roamed to where it is connected through a radio network node not supporting the associated bearer type and to provide the indication to the service change unavailability determining unit 314.

A further potential cause for an unavailability of a service change is the activation of a supplementary service for the call connection within the register 313, wherein the supplementary service is provided for the current service and not for the target service. Supplementary services are administrated within the SSAU (supplementary service administration unit) 315 connected to the register 313 and the service change unavailability determining unit 314. To detect this unavailability cause the service change unavailability determining unit 314 may be embodied to access a data record within the supplementary service administration unit 315 indicating that the supplementary service is activated for a call connection of a mobile subscriber administrated within the register 313. Furthermore the service change unavailability determining unit 314 may be embodied to determine that the activated supplementary service is unavailable for the target service and, as the supplementary service is activated, to detect the unavailability of a service.

When the cause for the unavailability of the service change has ceased to apply for a specific mobile subscriber, the service change unavailability determining unit 314 is advantageously embodied to determine that a service change is available again and to initiate assembling a further indication signal indicating the availability of the service change towards the mobile subscriber and sending the further indication signal via the terminal interface 312.

Figure 4:
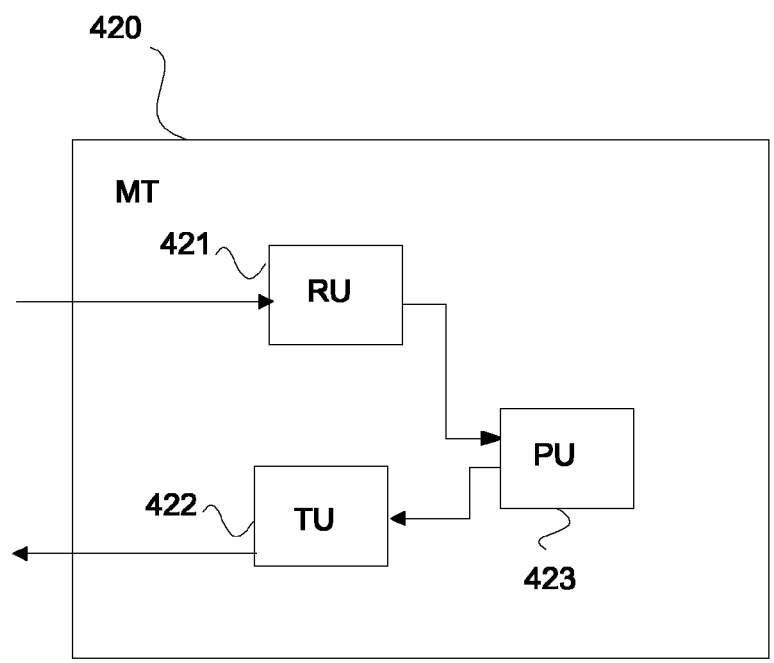
FIG. 4 is a block diagram depicting a mobile terminal in accordance with the teachings of the present invention

FIG. 4 is a block diagram illustrating a MT (mobile terminal) 420 for reducing the number of unsuccessful service change attempts in accordance with the teachings of the present invention. The mobile terminal 420 is connectable to another mobile terminal by establishing call connections according to plurality of services of various service types e.g. a speech service, a data service, a video telephony service or a multimedia service. To provide switching between the various service types SCUDIF (Service Change and UDI Fallback) functionality may be used in the mobile station 420, that may issue service change request via a SI (sending interface) 422 to initiate switching from a current service towards a target service.

To avoid unnecessary service change requests, the mobile station 420 comprises an RU (receiver unit) 421 for receiving an indication signal indicating that a service change from a current service towards a target service is currently unavailable and for transmitting said indication signal to a PU (processing unit) 423 that is embodied to process the indication signal and to refrain from initiating service change requests towards the target service until reception of a further indication signal within the receiver unit 421, wherein the further indication signal indicates that a service change is available again. The first indication signal advantageously comprises a cause for the unavailability of the service change, such as a cause that is applicable with regard to an indicated target service. The processing unit 423 is advantageously adapted to process that cause and to provide the cause via an outputting device to the user of the mobile terminal 420.

Furthermore the receiver unit 421 is advantageously embodied to receive a further indication signal that indicates that a service change towards the target service is available again and to provide the further signal towards the processing unit 423. In response to the provision of the further indication signal the processing unit 423 is embodied to process the further signal and to admit issuing service change request.

In that regard, when a service change request is to be issued e.g. upon a user interaction, the processing unit 23 is arranged to assemble a service change request signal and to initiate sending the service change request signal via the TU (transmitter unit) 422.

Figure 5:
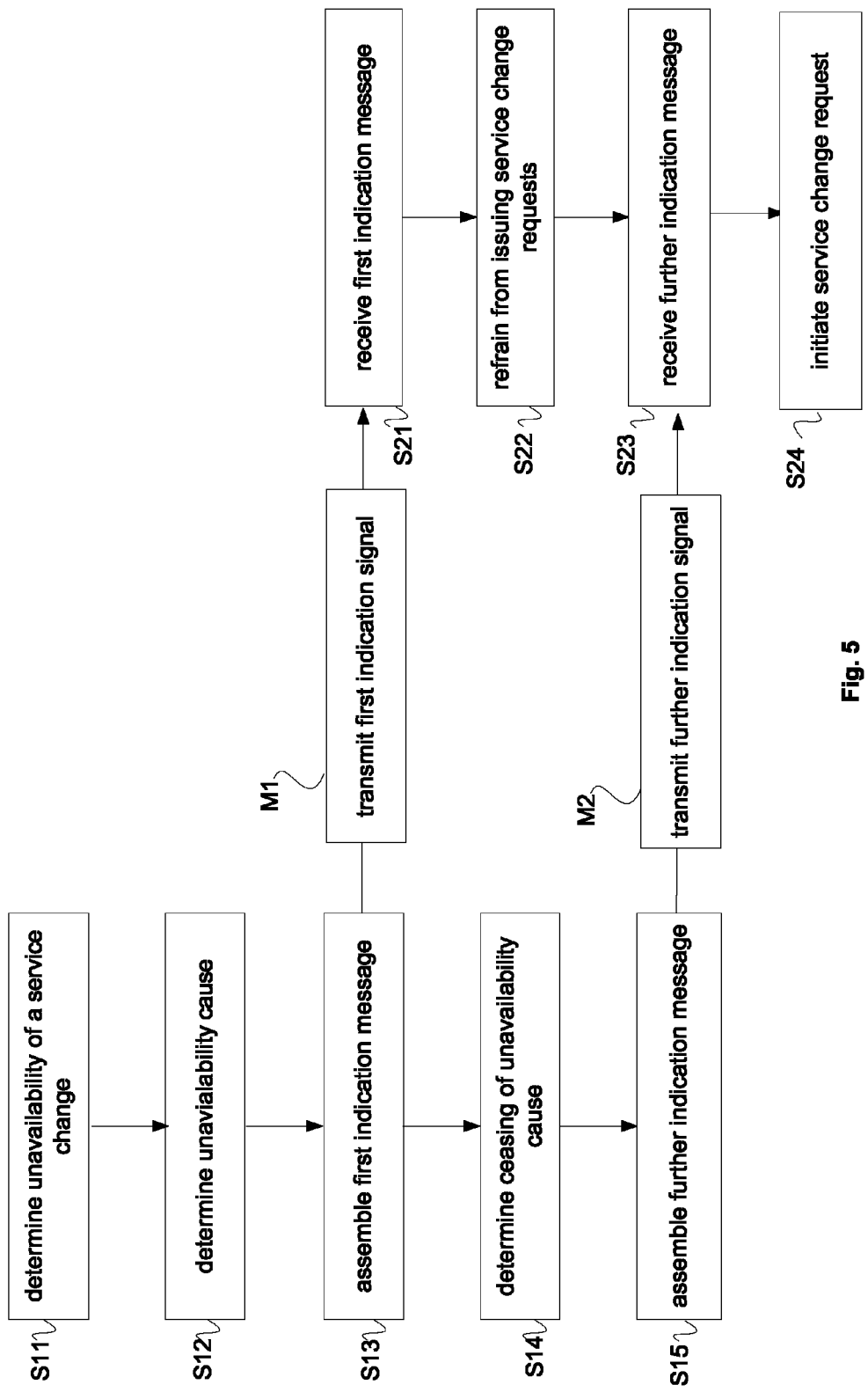
FIG. 5 is a flowchart depicting a sequence of processing steps in accordance with the teachings of the present invention

FIG. 5 is a flowchart illustrating a method for reducing the number of unsuccessful service change attempts of a mobile terminal in accordance with the teachings of the present invention. In particular FIG. 5 depicts steps S11-S15 in a mobile network node, steps S21-S24 in a mobile terminal, and signals M1 and M2 transmitted from the mobile network node to the mobile terminal. The processing steps S11-S15 may be performed within the signaling network node illustrated in FIG. 3, the processing steps S21-S24 may be performed within the mobile terminal illustrated in FIG. 4 and the signals M1 and M2 may be transmitted by the signaling network node of FIG. 3 and received within the mobile terminal of FIG. 4. For conciseness the description of the mobile network node and the mobile terminal is referred to rather than being repeated.

The processing sequence of FIG. 5 is initiated with a determining step S11, in that a determination is made in the mobile network node, that a service change towards a target service is temporarily unavailable for a concerned mobile terminal. Advantageously an unavailability cause is determined in processing step S12, e.g. that a supplementary service is activated for the current service and is not available for the target service. Another potential cause for unavailability of a service change is that the concerned mobile terminal has roamed into a radio network not supporting the target service or to a radio network node handling a radio connection towards the concerned mobile terminal that does not support the bearer type that is associated with the target service.

Subsequent to the processing step S12 an indication signal is assembled in a processing step S13 within the mobile network node, wherein the indication signal comprises an indication that a service change is temporarily unavailable for the mobile station. Advantageously an unavailability cause that has been previously determined is included in the indication signal. The indication signal is transmitted as a first indication signal from the mobile network node in a transmission step M1 and received within the mobile terminal in a reception step S21. The mobile station performs a processing step S22 and refrains from initiating service change requests until reception of a further indication message indicating that a service change is available again for the concerned mobile terminal.

In an advantageous embodiment of the invention the mobile network node performs a processing step S14 and determines that the cause of the unavailability of the service change has ceased to apply and assembles a further indication signal in a processing step S15. The further indication signal indicates that a service change is available again towards the addressed mobile station. Advantageously the assembling step S15 comprises including an availability cause in the further indication signal. The further indication signal is transmitted in the transmission step M2 towards the concerned mobile station and received within the mobile station in the reception step S23. In response to receiving the further indication signal, the mobile station may initiate a service change request in step S 24 e.g. by sending a service change request signal, e.g. when an application program within the mobile station or a user interaction request such a service change.

The invention claimed is:

1. A method for reducing the number of unsuccessful service change attempts of a first mobile terminal via a mobile network to a further terminal by establishing a call connection for providing a speech service or by establishing a call connection for providing a video or multimedia service, the method comprising the following steps performed by the first mobile terminal:
receiving a first indication signal from a mobile network node administrating a call connection establishment for the speech service, the first indication signal indicating that a service change from the speech service to the video or multimedia service is temporarily unavailable, and in response to receiving the first indication signal, refraining from requesting a service change from the speech service to the video or multimedia service until reception of a further indication signal from the mobile network node indicating that the service change is available again.

2. The method according to claim 1, comprising the following steps performed by the first mobile terminal:
receiving a signal indicating that a service change from the speech service to the video or multimedia service is available again as further indication signal, and
indicating, after receiving the further indication signal, a service change request to the mobile network node to request a service change from the speech service to the video or multimedia service.

3. The method according to claim 1, the first signal indicating that a service change is unavailable comprises an unavailability cause indication indicating a cause for the unavailability of the service change.

4. The method according to claim 3, comprising the step of indicating the unavailability cause to the user of the first mobile terminal.

5. A mobile terminal configured to reduce the number of unsuccessful service change attempts, the mobile terminal being connectable via a mobile network to a second mobile terminal by a call connection for providing a speech service or by a call connection for providing a video or multimedia service, the mobile terminal comprising:
one or more receiver units for receiving a first indication signal indicating that a service change from the speech service to the video or multimedia service is temporarily unavailable and for receiving a further indication signals indicating that a service change from the speech service to the video or multimedia service is available again, and
a processing unit configured to process an indication signal received as first indication signal and for refraining in response to said processing said first indication signal from requesting a service change from the speech service to the video or multimedia service until reception of an indication received as further indication signal.

6. The mobile terminal according to claim 5, comprising a sending unit for sending service change request signals requesting a service change from the speech service to the video or multimedia service, wherein the processing unit is adapted to process an indication signal received as further indication signal in response to said processing said further indication signal to initiate sending a service change request signal by the transmitter unit.

7. The mobile terminal according to claim 5, wherein the processing unit is adapted to process an unavailability cause indication indicating a cause for the unavailability of the service change, the cause being included within the first indication signal.

8. The mobile terminal according to claim 7, comprising a user interface wherein the processing unit is adapted to initiate presenting the unavailability cause via the user interface.

9. A method for reducing the number of unsuccessful service change attempts of a first mobile terminal connected via a mobile network node to a second mobile terminal by establishing a call connection for providing a speech service or a call connection for providing a video or multimedia service, the mobile network node administrating a call connection establishment for the speech service to the first mobile terminal, the method comprising the following steps performed by the mobile network node:

determining that a service change from the speech service to the video or multimedia service is temporarily unavailable for the first mobile terminal and sending an indication signal towards the first mobile terminal, indicating the temporal unavailability of the service change, such that the first mobile terminal refrains from requesting the service change from the speech service to the video or multimedia service until a further indication is received indicating that the service change is available again.

10. The method according to claim 9, wherein the determining step comprises determining that the first mobile terminal has roamed into a radio network not supporting a call connection providing the video or multimedia service.

11. The method according to claim 9, wherein a bearer type is associated with the video or multimedia service and wherein the determining step comprises determining that a radio network node handling a radio connection to the first mobile terminal does not support the bearer type associated with the video or multimedia service.

12. The method according to claim 9, wherein a supplementary service is available for the speech service and is not available for the video or multimedia service and wherein the determining step comprises determining that the supplementary service has been activated for the call connection providing the speech service.

13. The method according to claim 9, wherein the determining step comprises determining a cause for the unavailability of the service change and wherein the sending step comprises including the unavailability cause into the indication signal.

14. The method according to claim 9, wherein the indication signal is a first indication signal and the determining step is a first determining step, and wherein the method comprises a second determining step for determining that a service change from the speech service to the video or multimedia service is available again and a sending step for a sending a second indication signal indicating the availability of the service change towards the mobile station.

15. A mobile network node configured to reduce the number of unsuccessful service change attempts of a first mobile terminal connectable to a second mobile terminal by a call connection for providing a speech service or a call connection for providing a video or multimedia service, wherein the mobile network node manages the first mobile terminal and call connection establishment for the speech service to the mobile terminal, the mobile network node comprising:

a service change unavailability determining unit configured to determine that the service change from the speech service to the video or multimedia service is temporarily unavailable for the first mobile terminal and a sending unit for sending an indication signal towards the first mobile terminal, the indication signal indicating the temporal unavailability of the service change, such that the first mobile terminal refrains from requesting the service change from the speech service to the video or multimedia service until a further indication is sent indicating that the service change is available again.

16. The mobile network node according to claim 15, comprising a radio network interface for receiving a roaming indication indicating that the first mobile terminal has roamed into a radio network, wherein the radio network does not support a call connection providing the video or multimedia service and wherein the service change unavailability determining unit is adapted to determine the unavailability of the service change in response to the processing the received roaming indication.

17. The mobile network node according to claim 15, comprising a radio network interface for receiving a radio network node indication indicating a radio network node handling a radio connection towards the first mobile terminal, wherein the radio network node does not support a bearer type associated with the video or multimedia service and wherein the service change unavailability determining unit is adapted to determine the unavailability of the service change in response to processing the received radio network node indication.

18. The mobile network node according to claim 15, comprising a supplementary services administration unit for administrating a supplementary service that is available for the speech service and unavailable for the video and multimedia service, for determining whether the supplementary service has been activated for the call connection providing the speech service and for indicating the determining result towards the service change unavailability determining unit.

19. The mobile network node according to claim 15, wherein the service change unavailability determining unit is adapted to determine a cause for the unavailability of the service change and the sending unit is adapted to include the unavailability cause into the indication signal.

20. The mobile network node according to claim 15, wherein the indication signal is a first indication signal and the determining step is a first determining step, and wherein the service change unavailability determining unit is adapted to determine that a service change from the speech service to the video or multimedia service is available again and the sending unit is adapted to send a second indication signal indicating the availability of the service change towards the mobile station.

* * * * *